US012759446B2

(12) United States Patent
Blair et al.

(10) Patent No.: US 12,759,446 B2
(45) Date of Patent: Oct. 13, 2026

(54) VALVE ASSEMBLY

(71) Applicant: Lear Corporation, Southfield, MI (US)

(72) Inventors: Samuel Blair, Troy, MI (US); Timothy Cloutier, Southfield, MI (US); David J. Abdella, Royal Oak, MI (US)

(73) Assignee: LEAR CORPORATION, Southfield, MI (US)

(*) Notice: Subject to any disclaimer, the term of this patent is extended or adjusted under 35 U.S.C. 154(b) by 441 days.

(21) Appl. No.: 18/301,622

(22) Filed: Apr. 17, 2023

(65) Prior Publication Data

US 2024/0343174 A1 Oct. 17, 2024

(51) Int. Cl.

| | |
|---|---|
| ***B60N 2/66*** | (2006.01) |
| ***B60N 2/90*** | (2018.01) |
| ***F16K 11/22*** | (2006.01) |

(52) U.S. Cl.

CPC ............. *B60N 2/665* (2015.04); *B60N 2/914* (2018.02); *B60N 2/976* (2018.02); *F16K 11/22* (2013.01)

(58) Field of Classification Search

CPC ........ B60N 2/665; B60N 2/914; B60N 2/976; F16K 11/22

USPC .......................................... 297/452.41, 284.6

See application file for complete search history.

(56) References Cited

U.S. PATENT DOCUMENTS

| | | | | | |
|---|---|---|---|---|---|
| 2,938,570 | A * | 5/1960 | Flajole | A47C 27/081 | 267/117 |
| 3,303,518 | A * | 2/1967 | Ingram | A47C 27/10 | 5/710 |
| 3,678,959 | A * | 7/1972 | Liposky | A61M 39/223 | 251/282 |
| 3,867,732 | A * | 2/1975 | Morrell | A47C 27/082 | 297/284.3 |
| 4,078,842 | A * | 3/1978 | Zur | A47C 7/021 | 297/284.6 |
| 4,617,690 | A * | 10/1986 | Grebe | A61G 7/05769 | 5/713 |
| 5,226,451 | A * | 7/1993 | Brumfield | E03C 1/023 | 251/266 |
| 6,687,936 | B2 * | 2/2004 | Graebe | A47C 27/081 | 137/625.48 |
| 9,080,581 | B2 | 7/2015 | Bocsanyi et al. | | |
| 10,899,262 | B2 | 1/2021 | Wheeler | | |
| 12,104,703 | B2 * | 10/2024 | Nicola | F16K 31/025 | |
| 2014/0232155 | A1 * | 8/2014 | Bocsanyi | B60N 2/914 | 297/284.6 |
| 2022/0080868 | A1 | 3/2022 | Kalmutzki et al. | | |

FOREIGN PATENT DOCUMENTS

| | | | | | |
|---|---|---|---|---|---|
| DE | 102014001678 | B3 | | 7/2014 | |
| GB | 2001108 | A | * | 1/1979 | D06F 33/08 |

* cited by examiner

*Primary Examiner* — Milton Nelson, Jr.

(74) *Attorney, Agent, or Firm* — Carlson, Gaskey & Olds, P.C.

(57) ABSTRACT

An assembly is provided with a manifold with an inlet, and a plurality of outlets in fluid communication with the inlet. A valve is in cooperation with the plurality of outlets and operable to a plurality of positions wherein in each of the plurality of positions, one of the plurality of outlets is open and others of the plurality of outlets are closed.

16 Claims, 4 Drawing Sheets

VALVE ASSEMBLY

TECHNICAL FIELD

Various embodiments relate to valve assemblies and fluid systems for vehicle seat assemblies.

DETAILED DESCRIPTION

Figure 1:
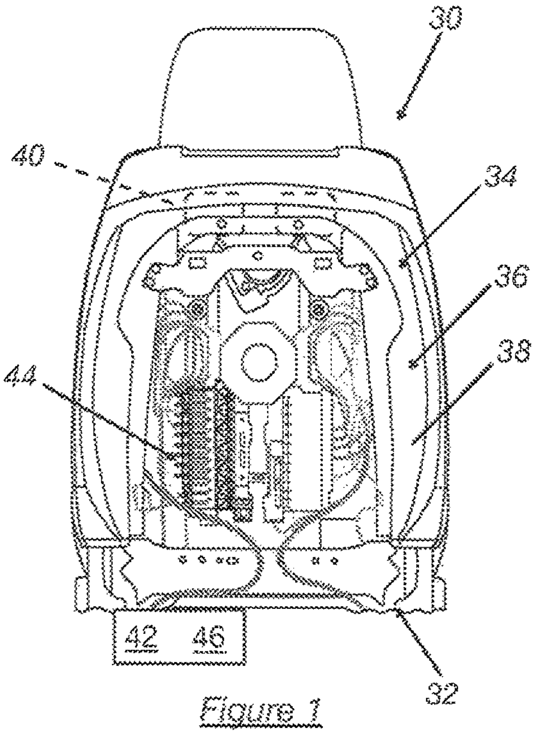
FIG. 1 is a rear elevation view of a seat assembly illustrated partially disassembled to reveal a valve assembly, according to an embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The terminology controller may be provided as one or more controllers or control modules for the various components and systems. The controller and control system may include any number of controllers, and may be integrated into a single controller, or have various modules. Some or all of the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer program that is embodied in a non-transitory computer readable medium that is programmed to perform any number of the functions as disclosed herein.

FIG. 1 illustrates a seat assembly 30 according to an embodiment. The seat assembly 30 may be a vehicle seat assembly 30 for a land vehicle, aircraft, watercraft, or the like. The seat assembly 30 may be positioned in any seating row within the vehicle. The seat assembly 30 is illustrated with a seat bottom 32 that is adapted to be mounted within a vehicle. The seat bottom 32 is sized to support a pelvis and thighs of an occupant. The seat assembly 30 also includes a seat back 34 extending upright from the seat bottom 32. The seat back 34 is sized to support a back and shoulders of the occupant at pelvic, lumbar, and thoracic regions of the occupant.

The seat back 34 includes a frame 36 to provide structural support to cushioning and trim components 38 that are installed on the frame 36. The seat assembly 30 also provides various comfort and adjustment features, such as massage or pressure distribution. The seat assembly 30 may include a plurality of actuators such as air bladders 40 for imparting a pressurized effect upon the occupant. The air bladders 40 are supported in the seat assembly 30. The air bladders 40 may be supported directly, or indirectly upon the frame 36 of the seat back to face the seating surface of the seat back 34 and to impart the pressurized effect upon the seating surface. Likewise, the air bladders 40 may supported upon foam, a cushion, a trim component, or a suitable additional reactionary surface material. Although two air bladders 40 are illustrated, any combination or array of actuators 40 may be provided along the seating surface of the seat back 34. Likewise, a plurality of the actuators 40 may also be provided to impart the pressurized effect upon a seating surface of the seat bottom 32.

In order to operate the actuators 40, and provide a source of pressurized fluid, such as air, to the actuators, the seat assembly 30 includes a compressor 42. The compressor 42 is illustrated schematically beneath the seat bottom 32. The compressor 42 may be located anywhere within the seat assembly 30. The seat assembly 30 also includes a valve assembly 44 in fluid communication with the compressor 42 to receive the pressurized air from the compressor 42. The valve assembly 44 is also in fluid communication with the plurality of actuators 40 to relay the pressurized air to the actuators 40 as a pneumatic system. A controller 46 is also provided in the seat assembly 30 in electrical communication with the compressor 42 and the valve assembly 44 to control operation of the valve assembly 44.

Conventional valve assemblies 44 include a plurality of valves to perform a plurality of functions. Such pneumatic functions often include inflation and deflation, which can be utilized for massage, adjustment, comfort or the like. Valve assemblies 44 often have a dedicated valve per each function. Therefore, an increase in function often requires a significant increase in size, weight, and cost. Compactness is a goal of valve assemblies 44 in order to fit the valve assembly 44 within the seat assembly 30. Each valve within a valve assembly 44 often includes a solenoid, which each add significant cost and weight to the seat assembly 30. Additionally, weight reduction is often a goal in order to maximize fuel efficiency and/or energy efficiency of the associated vehicle. Therefore, a pneumatic system design may utilize a compromise or tradeoff between functionality and size/weight/cost.

Figure 2:
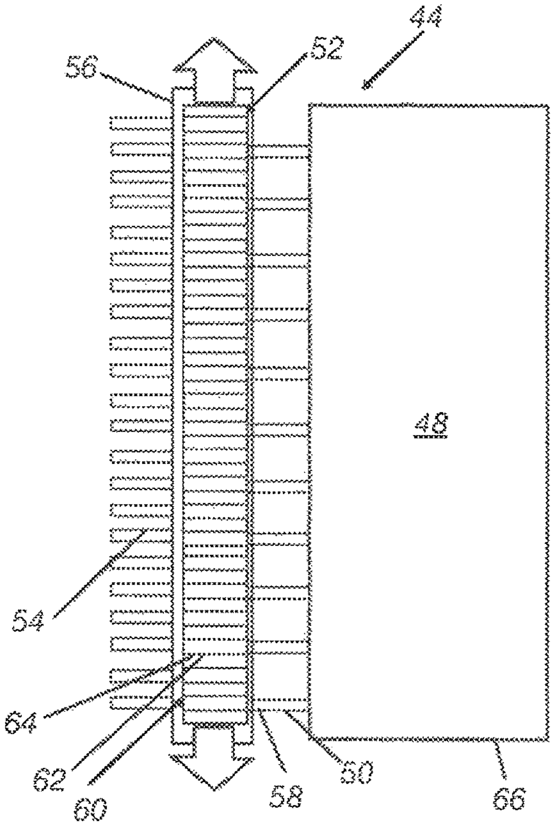
FIG. 2 is a schematic view of the valve assembly of FIG. 1.
Figure 3:
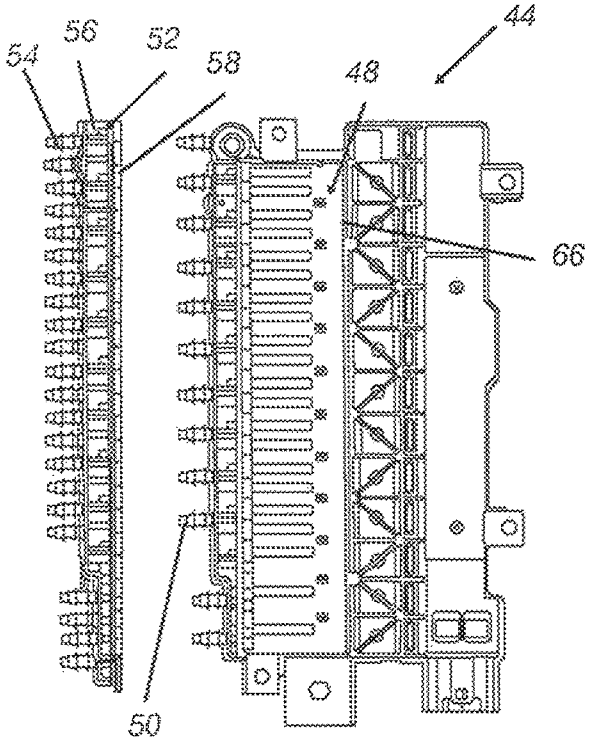
FIG. 3 is a partially exploded elevation view of the valve assembly of FIG. 1.

The valve assembly 44 is illustrated schematically in FIG. 2 and exploded in FIG. 3. The valve assembly 44 includes a valve block 48. The valve block 48 is similar to prior art valve assemblies and includes a fluid outlet 50 for each valve within the valve block 48. Each valve within the valve block 48 may be a solenoid operated valve, a shape-memory alloy valve, or the like, as is known in the art.

The valve assembly 44 includes a multiplier assembly 52 to multiply a quantity of functional outputs of the valve block 48. The multiplier assembly 52 includes a plurality of fluid outlets 54 that is a multiplied factor of the quantity of outputs of the valve block 48. For example, the multiplier assembly 52 is a doubler, and therefore, the quantity of multiplier outlets 54 is double the quantity of the valve block outlets 50. The multiplier assembly 52 may be a multiplier of any factor, such as a tripler. The multiplier assembly 52 provides a doubled function without doubling the size of the valve block 48, thereby providing a reduction in size, weight, and cost in contrast to providing two valve blocks 48.

The multiplier assembly 52 includes a manifold 56 with a plurality of inlets 58 each corresponding to one of the valve bank outlets 50. Each multiplier inlet 58 receives pressurized air from the corresponding valve bank outlet 50. A pair of multiplier outlets 54 are aligned with each multiplier inlet 58 to provide two different outlets 54 for each inlet 58.

With reference again to FIG. 2, the multiplier assembly 52 also includes a valve body 60 oriented within the manifold 56. The valve body 60 includes an alternating series of ports 62 and elastomeric seals 64 to provide a series of valves, whereby the manifold 56 provides an integral series of manifolds 56. The valve body 60 has two linear positions relative to the manifold 56. In one position, such as a lower position in FIG. 2, the ports 62 align with a subset of, such as half of, the multiplier outlets 54 to open the first half of the multiplier outlets so that the pressurized fluid passes through the multiplier inlets 58, the manifold 56 and valve body ports 62, and then out through half of the multiplier outlets 54. In the first position of the valve body in FIG. 2, the seals 64 are positioned to disconnect the other half of the multiplier outlets 54 to close the second half of the multiplier outlets 54 from fluid communication with the multiplier inlets 58.

In a second position of the valve body 60, such as an upper position in FIG. 2, the ports 62 align with the other half of the multiplier outlets 54 so that the pressurized fluid passes through the multiplier inlets 58, the manifold 56 and valve body ports 62, and then out through the second half of the multiplier outlets 54. In the second position of the valve body in FIG. 2, the seals 64 are positioned to disconnect the first half of the multiplier outlets 54 from fluid communication with the multiplier inlets 58. According to an embodiment, the manifold 56 may be formed integrally with a housing 66 of the valve bank 48.

By doubling the functional output of the valve bank 48, a doubled output of the valve bank 48 may be utilized. For example, each of the multiplier outputs 54 may be in fluid communication to actuate different air bladders 40. The multiplier assembly 52 may be adjustable to two different modes. The modes may be arranged as modes that are not typically performed at the same time, for example the first position may be an adjustment mode for adjusting different zones in the seat assembly 30 by inflation and deflation. The adjustment operations may include lower lumbar, middle lumbar, high lumbar, thoracis, shoulder, left bolster, right bolster, and the like. Conversely, the second position may align with a massage mode for massaging various massage bladders 40 by inflation and deflation.

Figure 4:
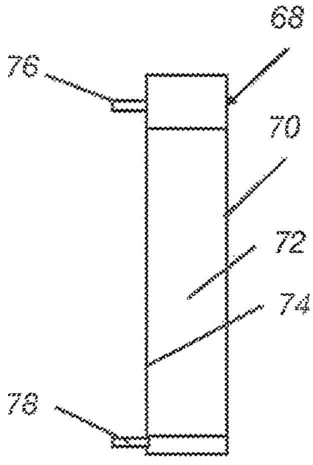
FIG. 4 is a partial schematic view of an actuator of the valve assembly of FIG. 1, according to an embodiment.

The multiplier assembly 52 performs as a valve switch multiplier assembly 52. The multiplier assembly 52 includes an actuator to actuate the valve body 60. The actuator may be linear, rotary (such as a rotary stepper motor), mechanical, pneumatic, electrical, a screw drive, or the like. FIG. 4 illustrates a linear pneumatic actuator 68 according to one embodiment. The actuator 68 includes a housing 70 with a pneumatic piston 72 received within a chamber 74 of the housing 70. A pair of ports 76, 78 are provided through the housing 70 and in fluid communication with the chamber 74. When air is received through the first port 76, the piston 72 is actuated downward to the first position while air is exhausted from the chamber 74 out of the second port 78.

Pressurized air ingresses the second port 78 to shift the piston 72 upward to the second position, while air egresses the first port 76. The piston 72 is connected to the valve body 60 to actuate the valve body 60 to the first and second positions. Alternatively, the piston 72 may be formed integrally with the valve body 60.

Figure 5:
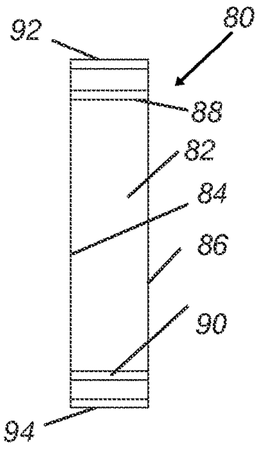
FIG. 5 is a partial schematic view of an actuator of the valve assembly of FIG. 1, according to another embodiment.

FIG. 5 illustrates an alternative linear actuator 80 for actuating the valve body 60. The actuator 80 includes a piston 82 within a chamber 84 of a housing 86. A pair of magnets 88, 90 are provided at opposed ends of the piston 82. A pair of electromagnets 92, 94 are provided on the housing 86. Application of a current to either electromagnet 92, 94 repels the corresponding magnet 88, 90 to drive the piston 82 to an opposed position. A reverse current can be applied in the opposite electromagnet 92, 94 to attract the corresponding magnet 88, 90 to shift the position of the piston 82. A combination of both features may be employed with a current in the repel direction in the first electromagnet 92 to repel the first magnet 88 and a current in the attract direction in the second electromagnet 94 to attract the second magnet 90 to shift the piston 82 downward to the first position. Conversely, the current in the attract direction can be applied to the first electromagnet 94 while the current in the repel direction is applied to the second electromagnet 94 to shift the piston 82 upward to the second position. Alternatively, the piston 82 may be formed integrally with the valve body 60.

Figure 6:
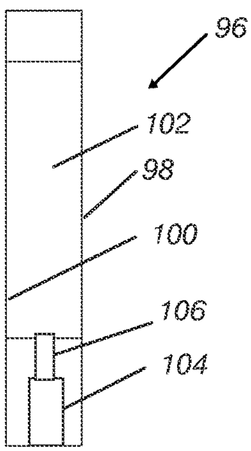
FIG. 6 is a partial schematic view of an actuator of the valve assembly of FIG. 1, according to another embodiment.

Another linear actuator 96 is illustrated in FIG. 6 for shifting the valve body 60. The actuator 96 includes a housing 98 with a chamber 100 for receipt of a piston 102. The actuator 96 includes a solenoid 104. Upon application of a current to the solenoid 104, an electromagnetic coil in the solenoid 104 repels a magnet on a rod 106 thereby shifting the rod 106 and the piston 102 upward to the second position. Removal of the current permits an internal spring within the solenoid 104 to retract the shaft 106 and shift the piston 102 downward to the first position. Alternatively, the spring may be located within the chamber 100 and outside the solenoid 104. According to another embodiment, a reverse current may be applied to the solenoid 104 to attract the magnet to retract the shaft 106 to shift the piston 102 downward. According to another embodiment, the piston 102 may be formed integrally with the valve body 60.

Figure 7:
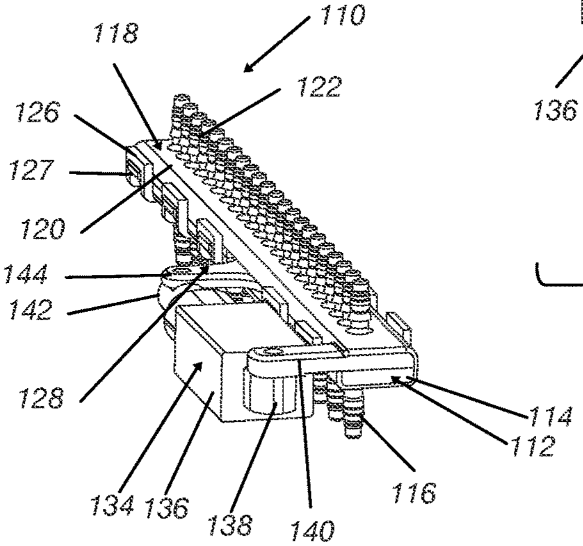
FIG. 7 is a perspective view of an actuator of the valve assembly of FIG. 1, according to another embodiment.
Figure 8:
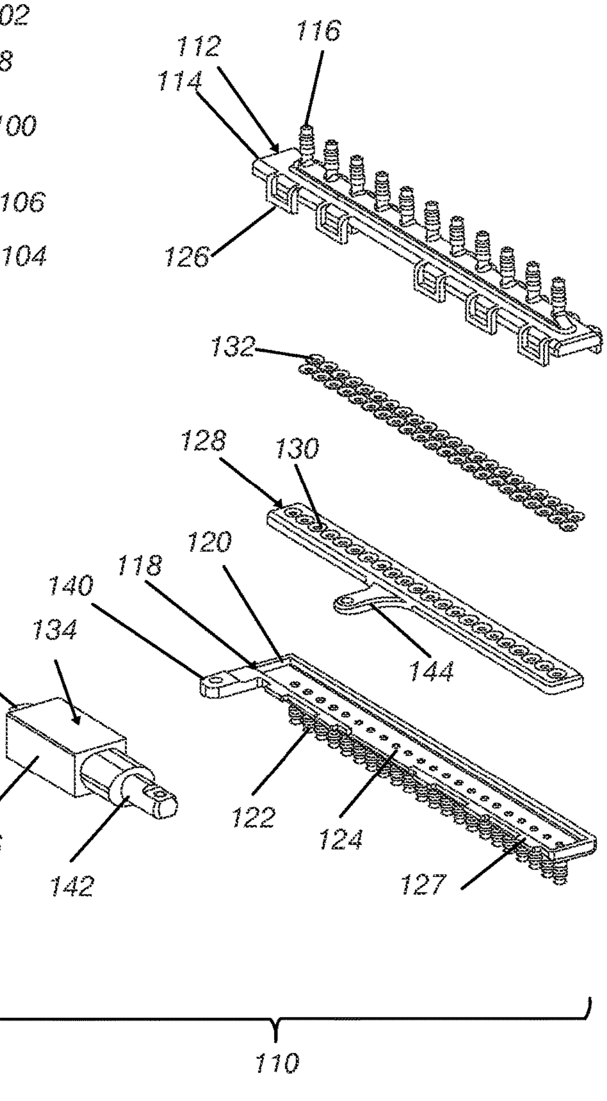
FIG. 8 is an exploded perspective view of the actuator of FIG. 7.

FIGS. 7 and 8 illustrate a multiplier assembly 110 according to another embodiment. The multiplier assembly 110 includes an inlet housing portion 112. The inlet housing portion 112 includes a substrate 114 that forms an inlet manifold with a plurality of ports 116 extending from the substrate 114 as inlets 116. The inlets 116 are provided incrementally spaced and in a linear array. Each inlet 116 is provided with radial symmetry for attachment of tubing to convey fluid into the manifold of the multiplier assembly 110.

The multiplier assembly 110 also includes an outlet housing portion 118. The outlet housing portion 118 includes a substrate 120 that forms an outlet manifold with a plurality of ports 122 extending away from the substrate 120 as outlets 122. The outlets 122 are provided incrementally spaced and in a linear array. Each outlet 122 is provided with radial symmetry for attachment of tubing to convey fluid from the manifold of the multiplier assembly 110. The outlets 122 have a quantity that is a multiplied factor of the inlets 116. For example, there are two outlets 122 for each inlet 116.

A cavity 124 is provided in each substrate 114, 120 to collectively provide a fluid chamber for the manifold formed collectively by the inlet housing portion 112 and the outlet housing portion 118. Each of the housing portions 112, 118 may be formed from a structural material, such as a structural polymer. A plurality of retainers 126 are provided on the substrate 114 of the inlet housing portion 112. Each retainer 126 includes a flexible body with a central receptacle. A corresponding plurality of retainers 127 extend from the substrate 120 of the outlet housing portion 118. Each retainer 127 includes a leading edge and an abutment edge. During assembly of the housing portions 112, 118, the leading edge of the retainers 127 engage the flexible bodies of the retainers 126 to deflect the retainers 126 until the abutment edge aligns with the receptacle, whereby the flexible members retract with the abutment edge within the receptacle to retain the fasteners 127 within the retainers 126.

Referring now to FIG. 8, the multiplier assembly 110 includes a valve bar 128 received within the cavity 124 in the substrates 114, 120. The valve bar 128 has a series of ports 130 formed therethrough. A series of seals 132 are mounted to the valve bar 128. According to an embodiment, the seals 132 may each be provided as O-rings 132. The seals 132 cooperate with the ports 130 and the substrates 114. 120 so that at each position of the valve bar 128, each valve bar port 130 is in fluid communication with an associated inlet 116 and sealed off from the other inlets 116. The seals 132 also cooperate with the ports 130 and the substrates 114, 120 so that at one position of the valve bar 128, each valve bar port 130 is in fluid with a first outlet 122 and isolated from the other outlets 122. The seals 132 cooperate with the ports and the substrates 114. 120 so that at a second position of the valve bar 128, each valve bar port is in fluid communication with a second outlet 122 and isolated from the other outlets 122.

With reference now to FIGS. 7 and 8, the multiplier assembly 110 includes a linear actuator 134, which according to an embodiment, is an electric motor based linear actuator 134. According to another embodiment, the actuator 134 is a solenoid 134. The actuator 134 includes a housing 136 with a pivot or clevis bracket 138. A corresponding clevis bracket 140 extends from the substrate 120 of the outlet housing portion 118. The clevis bracket 138 of the actuator 134 is pivotally connected to the clevis bracket 140 of the inlet housing portion 118 to support the actuator 134. The actuator 134 is operated to extend and retract a shaft 142 relative to the solenoid housing 136. A distal end of the shaft 142 is pivotally connected to a shift extension 144 of the valve bar 128 so that extension and retraction of the solenoid shaft 142 shifts the valve bar 128 between the first position and the second position.

The valve block switching mechanism 110 can turn the eleven-function modular valve bank 48 into a twenty-two function valve bank 48, 110 without doubling the size of the valve bank 48. The doubled functionality is provided by adding one more actuator, instead of eleven more actuators. Referring again to FIG. 1, the seat assembly 30 may employ two valve assemblies 44, wherein the functionality of each valve assembly 44 is multiplied without a double to size, weight, or cost.

Figure 9:
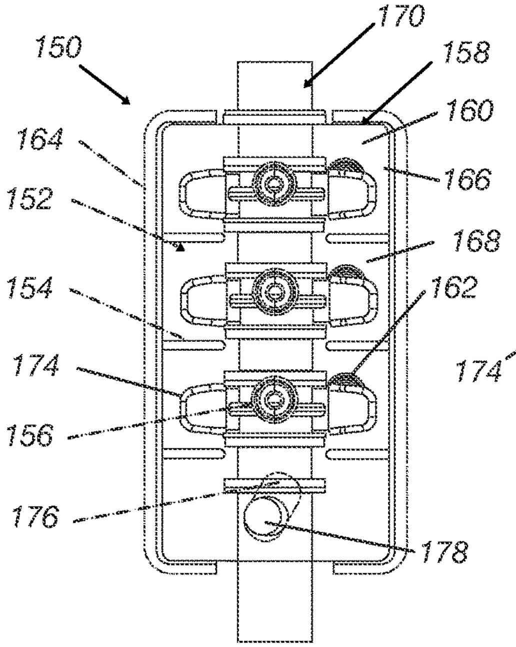
FIG. 9 is a front elevation view of an actuator of the valve assembly of FIG. 1, according to another embodiment, illustrated in a first position.
Figure 10:
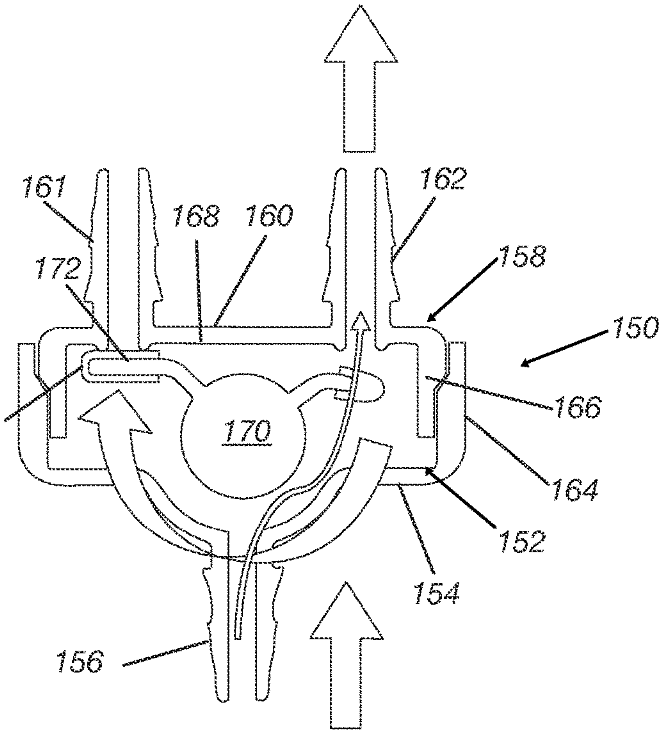
FIG. 10 is an axial end view of the actuator of FIG. 9.
Figure 11:
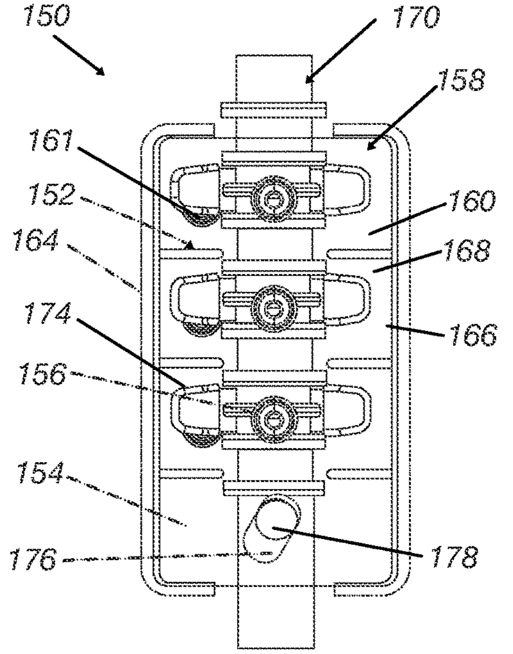
FIG. 11 is another front elevation view of the actuator of FIG. 9, illustrated in a second position.
Figure 12:
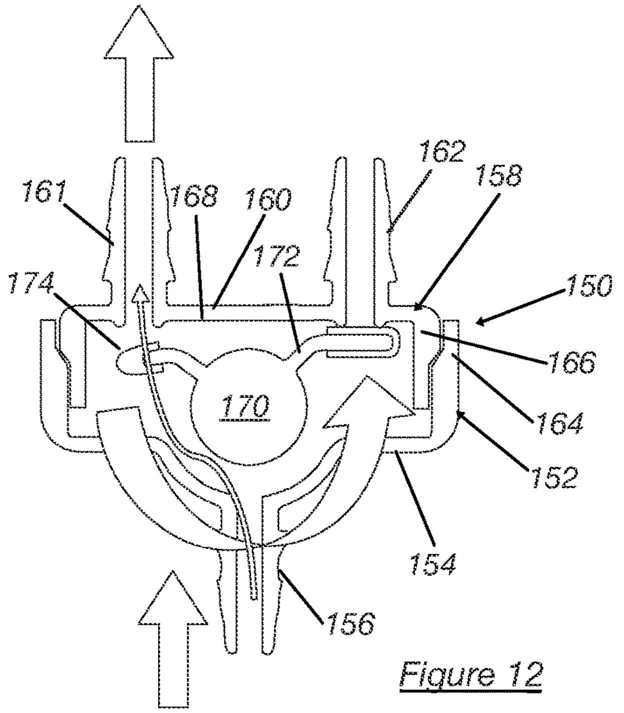
FIG. 12 is an axial end view of the actuator of FIG. 11.

FIGS. 9-12 illustrate a multiplier assembly 150 according to another embodiment. FIGS. 9 and 10 illustrate the multiplier assembly 150 in a first position, and FIGS. 11 and 12 illustrate the multiplier assembly 150 in a second position.

The multiplier assembly 150 includes an inlet housing portion 152. The inlet housing portion 152 includes a substrate 154 that forms an inlet manifold with a plurality of ports 156 extending from the substrate 154 as inlets 156. The inlets 156 are provided incrementally spaced and in a linear array. Each inlet 156 is provided with radial symmetry for attachment of tubing to convey fluid into the manifold of the multiplier assembly 150.

The multiplier assembly 150 also includes an outlet housing portion 158. The outlet housing portion 158 includes a substrate 160 that forms an outlet manifold with a two series of ports 161, 162 extending away from the substrate 160 as outlets 161, 162. The outlets 161. 162 are provided incrementally spaced and in a linear array. Each outlet 161, 162 is provided with radial symmetry for attachment of tubing to convey fluid from the manifold of the multiplier assembly 150. The outlets 161, 162 have a quantity that is a multiplied factor of the inlets 156. For example, there are two outlets 161, 162 for each inlet 156.

A plurality of sidewalls 164 extend from the base or substrate 154 of the inlet housing portion 152 to engage a plurality of sidewalls 166 that extend from the base or substrate 160 of the outlet housing portion 158. A cavity 168 is provide collectively within the substrates 154, 160 and the sidewalls 164, 166 to provide a fluid chamber for the manifolds. Each of the housing portions 152, 158 may be formed from a structural material, such as a structural polymer. During assembly of the housing portions 152, 158, the sidewalls 166 of the outlet housing portion 158 are inserted into the sidewalls 164 of the inlet housing portion 152. The sidewalls 166 are sealed to the sidewalls 164 by fasteners, adhesives, welding or the like.

The multiplier assembly 150 includes a valve bar 170 received within the cavity 168 in the housing portions 152, 158. The valve bar 170 cooperates with the housing portions 152, 158 to pivot and translate relative to the manifolds in the housing portions 152, 158. A plurality of radial extensions 172 extend from the valve bar 170 as paddles 172. An elastomeric seal 174 is provided on each of the radial extensions 172.

The first inlet housing portion 152 includes a slot 176 formed therethrough. The slot 176 is angled relative to an axial direction of the valve bar 170. A pin 178 extends radially outward from the valve bar 170. The pin 178 is received in the slot 176. The angled slot 176 provides cam surfaces whereby the pin 178 is a cam follower to convert linear motion to rotary motion. For example, as the valve bar is shifted linearly from a lower position in FIGS. 9 and 10 to an upper position in FIGS. 11 and 12, the pin 178 follows the slot 176 thereby pivoting the valve bar 170 counterclockwise from FIGS. 10 to 12. A return motion of the valve bar 170 downwards from FIGS. 11 and 12 to FIGS. 9 and 10, causes the pin 178 to follow the slot 176 whereby the shaft 170 rotates clockwise from FIG. 12 to FIG. 10. A linear actuator may be provided as the input of linear motion. Alternatively, a rotary actuator may be employed, whereby the pin 178 and slot 176 cooperate to convert the rotary motion to linear motion.

At the lower position of the valve bar 170 in FIGS. 9 and 10, the seals 174 close one column of outlet ports 161 as illustrated in FIG. 10. Likewise, the seals 174 open the other column of outlets 162 so that air from each inlet 156 is directed through the outlet 162. When valve bar 170 is shifted to the upward position of FIGS. 11 and 12, the air is redirected to the other mode of outlets 161 instead of the outlets 162. FIG. 12 illustrates that the seal 174 is retracted from, to open, the outlets 161 while the opposed seal 174 is seated against the port 162 to close the ports 162. The rotation of the valve bar 170 can be optimized, such as at ten degrees for example, so that the valve bar 170 and seals 174 operate as a twist-gate valve assembly.

Figure 13:
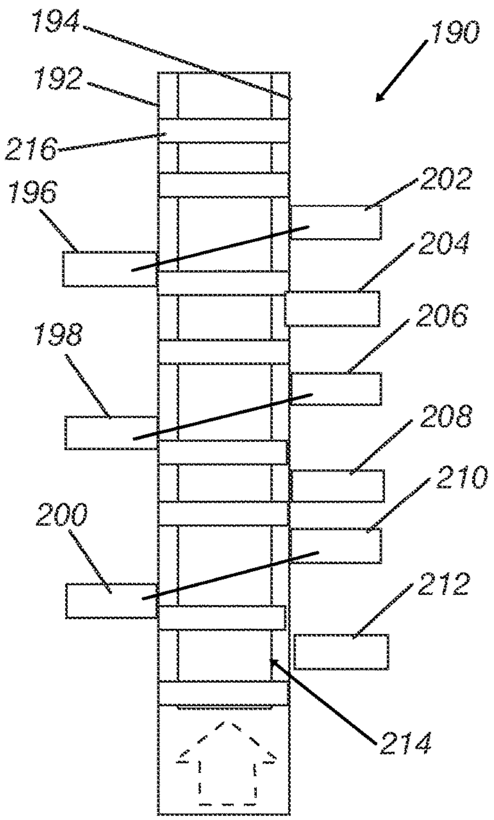
FIG. 13 is a schematic view of an actuator of the valve assembly of FIG. 1, according to another embodiment, illustrated in a first position.
Figure 14:
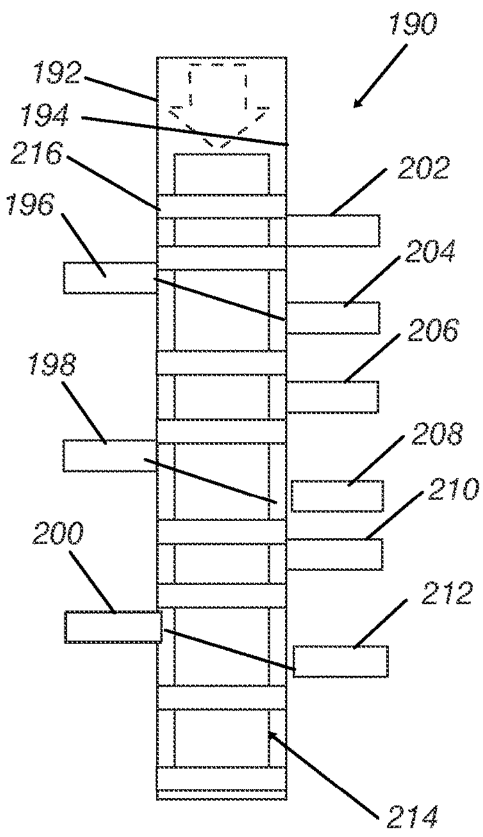
FIG. 14 is another schematic view of the actuator of FIG. 13, illustrated in a second position.

FIGS. 13 and 14 illustrate a multiplier assembly 190 according to another embodiment. The multiplier assembly 190 includes a housing 192 with a fluid chamber 194. The housing 192 defines a plurality of manifolds for the valve assembly 44. The housing 192 includes a plurality of inlets 196, 198, 200 in fluid communication with the fluid chamber 194. The inlets 196, 198, 200 are provided incrementally spaced and in a linear array. The housing 192 includes a plurality of outlets 202, 204, 206, 208, 210, 212 in fluid communication with the fluid chamber 194. The outlets 202, 204, 206, 208, 210, 212 are provided incrementally spaced and in a linear array. The outlets 202, 204, 206, 208, 210, 212 have a quantity that is a multiplied factor of the inlets 196, 198, 200. For example, there are two outlets 202, 204, 206, 208, 210, 212 for each inlet 196, 198, 200.

The multiplier assembly 190 includes a valve bar 214 received within the chamber 194. A series of seals 216 are mounted to the valve bar 214. According to an embodiment, the seals 216 may each be provided as O-rings 216. In a first mode, depicted by an upward position of the valve bar 214 in FIG. 13, the seals 216 provide fluid paths between the inlets 196, 198, 200 and three of the outlets 202, 206, 210 respectively. Likewise, in the first position, the seals 216 isolate the outlets 204, 208, 212. A second mode is provided by the downward position of the valve bar 214 in FIG. 14. In the downward position, the valve bar 214 is shifted such that the seals isolate the outlets 202, 206, 210 to prevent the pressurized air from passing out of the outlets 202, 206, 210. In this position, the seals 216 provide fluid paths for the air to pass from the inlets 196, 198, 200 through the chamber 194 and out of the outlets 204, 208, 212 respectively. Although three inlets 196, 198, 200 and six outlets 202, 204, 206, 208. 210, 212 are illustrated any multiplier of outlets may be employed. Additionally, any number of inlets 196, 198, 200, such as eleven inlets may be input and multiplied.

According to a first clause, an assembly is provided in combination with or without any of the successive clauses. The assembly comprises a manifold with an inlet, and a plurality of outlets in fluid communication with the inlet. A valve is in cooperation with the plurality of outlets and operable to a plurality of positions wherein in each of the plurality of positions, one of the plurality of outlets is open and others of the plurality of outlets are closed.

According to a second clause, a system comprises the assembly in combination with or without any of the preceding or successive clauses. A source of pressurized fluid is in fluid communication with the inlet of the manifold.

According to a third clause, the system in combination with or without any of the preceding or successive clauses, further comprises a compressor. A valve is in fluid cooperation with the compressor to receive pressurized fluid from the compressor, and is in fluid communication with the inlet of the manifold to convey the pressurized fluid to the manifold.

According to a fourth clause, the assembly in combination with or without any of the preceding or successive clauses further comprises at least one actuator in fluid communication with the plurality of outlets of the manifold to receive a pressurized fluid distributed through the manifold.

According to a fifth clause, the assembly in combination with or without any of the preceding or successive clauses further comprises a plurality of actuators each in fluid communication with one of the plurality of outlets of the manifold to receive a pressurized fluid distributed through the corresponding outlet of the manifold.

According to a sixth clause, a seat assembly comprises a seat bottom, a seat back, the assembly in combination with or without any of the preceding or successive clauses, and an actuator oriented in the seat bottom or the seat back. The actuator is in fluid communication with the plurality of outlets of the manifold to receive a pressurized fluid distributed through the manifold.

According to a seventh clause, an assembly in combination with or without any of the preceding or successive clauses comprises a series of manifolds, each with an inlet, and a plurality of outlets in fluid communication with the inlet. A series of valves is each in cooperation with the plurality of outlets of one of the series of manifolds and operable to a plurality of positions wherein in each of the plurality of positions, one of the plurality of outlets is open and others of the plurality of outlets are closed.

According to an eighth clause, the assembly in combination with or without any of the preceding or successive clauses further comprises a housing. The housing comprises the series of manifolds therein.

According to a ninth clause, the assembly in combination with or without any of the preceding or successive clauses further comprises an actuator in cooperation with the series of valves to actuate the series of valves to the plurality of positions.

According to a tenth clause, the assembly in combination with or without any of the preceding or successive clauses further comprises a valve bar in cooperation with the series of valves, and movable relative to the series of manifold. The valve bar is in cooperation with the actuator to shift the series of valves to the plurality of positions.

According to an eleventh clause, the assembly in combination with or without any of the preceding or successive clauses further comprises a linear actuator, and the valve bar is translatable relative to the series of manifolds.

According to a twelfth clause, the assembly is in combination with or without any of the preceding or successive clauses wherein the valve bar further comprises the series of valves.

According to a thirteenth clause, the assembly in combination with or without any of the preceding or successive clauses further comprises a plurality of seals in cooperation with the valve bar and the series of manifolds to direct fluid to one subset of the plurality of outlets while isolating others of the plurality of outlets.

According to a fourteenth clause, the assembly is in combination with or without any of the preceding or successive clauses wherein the valve bar is pivotal relative to the series of manifolds. The seals extend radially from the valve bar.

According to a fifteenth clause, the assembly is in combination with or without any of the preceding or successive clauses wherein the actuator further comprises a rotary actuator.

According to a sixteenth clause, the assembly is in combination with or without any of the preceding or successive clauses wherein the valve bar further comprises a shaft that cooperates with the series of manifolds to pivot and translate relative to the series of manifolds.

According to a seventeenth clause, the assembly is in combination with or without any of the preceding or successive clauses wherein the shaft further comprises a cam or a follower. The series of manifolds further comprises a cam or a follower in cooperation with the cam or the follower of the shaft. The actuator further comprises a linear actuator to translate the shaft relative to the series of manifolds such that the cam and the follower pivot the shaft relative to the series of manifolds.

According to an eighteenth clause, the assembly in combination with or without any of the preceding or successive clauses further comprises a housing with the manifolds therein, wherein the shaft is received within the housing to pivot and translate relative to the series of manifolds, and wherein an angled slot is formed in the housing. A pin extends from the shaft into the angled slot to limit movement of the shaft relative to the housing and to rotate the shaft as the shaft is translated by the actuator, or to translate the shaft as the shaft is rotated by the actuator.

According to a nineteenth clause, the assembly in combination with or without any of the preceding or successive clauses further comprises a housing. The housing comprises a base, a plurality of mating sidewalls extending from the base, and the series of manifolds therein.

According to a twentieth clause, the assembly is in combination with or without any of the preceding or successive clauses wherein the plurality of outlets is arranged as a linear array.

According to a twenty-first clause, any of the preceding clauses in any combination.

While various embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An assembly, comprising:

a manifold with a plurality of inlets and a plurality of outlets in fluid communication with the plurality of inlets, and wherein each inlet from the plurality of inlets is associated with one pair of outlets from the plurality of outlets;

a first valve engaged with the plurality of outlets and operable to a plurality of positions, wherein in each of the plurality of positions, one outlet from the one pair of outlets is open and the other outlet from the one pair of outlets is closed;

a source of pressurized fluid in fluid communication with the plurality of inlets of the manifold, wherein the source of pressurized fluid comprises a compressor; and a second valve in fluid communication with the compressor to receive the pressurized fluid from the compressor, and wherein the second valve is in fluid communication with one or more inlets of the plurality of inlets to convey the pressurized fluid to the manifold.

2. The assembly of claim 1 further comprising a plurality of actuators each in fluid communication with one of the plurality of outlets of the manifold to receive a pressurized fluid distributed through the corresponding outlet of the manifold.

3. The assembly of claim 1, wherein the plurality of outlets is arranged as a linear array.

4. The assembly of claim 1, wherein the manifold comprises a plurality of manifolds and further comprising a housing comprising the plurality of manifolds therein, each manifold having one inlet from the plurality of inlets and one pair of outlets from the plurality of outlets, and at least one actuator in fluid communication with the plurality of outlets of the manifold to receive the pressurized fluid distributed through the manifold.

5. An assembly comprising:
a plurality of manifolds, each with an inlet, and a plurality of outlets in fluid communication with the inlet;
a plurality of valves engaged with the plurality of outlets of one of the plurality of manifolds and operable to a plurality of positions, wherein in at least one of the plurality of positions, one of the plurality of outlets is open and others of the plurality of outlets are closed;
an actuator connected to the plurality of valves to actuate the plurality of valves to the plurality of positions;
the plurality of valves comprises a valve bar that is operably connected to the actuator to shift the plurality of valves to the plurality of positions;
a plurality of seals mounted on the valve bar and the plurality of manifolds to direct fluid to one subset of the plurality of outlets while isolating others of the plurality of outlets; and
wherein the valve bar is pivotal relative to the plurality of manifolds, and wherein the plurality of seals extend radially from the valve bar.

6. A seat assembly comprising:
a seat bottom;
a seat back;
an assembly comprising:
a manifold with a plurality of inlets and a plurality of outlets in fluid communication with the plurality of inlets, and wherein each inlet from the plurality of inlets is associated with one pair of outlets from the plurality of outlets,
a first valve engaged with the plurality of outlets and operable to a plurality of positions, wherein in each of the plurality of positions, one outlet from the one pair of outlets is open and the other outlet from the one pair of outlets is closed,
a source of pressurized fluid in fluid communication with the plurality of inlets of the manifold, wherein the source of pressurized fluid comprises a compressor, and
a second valve in fluid communication with the compressor to receive the pressurized fluid from the compressor, and wherein the second valve is in fluid communication with one or more inlets of the plurality of inlets to convey the pressurized fluid to the manifold; and
an actuator oriented in the seat bottom or the seat back, the actuator being in fluid communication with the plurality of outlets of the manifold to receive a pressurized fluid distributed through the manifold.

7. An assembly comprising:
a plurality of manifolds formed within a housing, each manifold having an inlet and a plurality of outlets in fluid communication with the inlet;
a plurality of valves engaged with the plurality of outlets of one of the plurality of manifolds and operable to a plurality of positions, wherein in at least one of the plurality of positions, one of the plurality of outlets is open and others of the plurality of outlets are closed;
an actuator; and
a valve bar connected to the plurality of valves, wherein the valve bar is operably connected to the actuator to shift the plurality of valves to the plurality of positions.

8. The assembly of claim 7, wherein the housing with the plurality of manifolds comprises an inlet housing portion and an outlet housing portion that are secured together to provide a cavity for the plurality of valves.

9. The assembly of claim 7, wherein the valve bar further comprises the plurality of valves.

10. The assembly of claim 9, further comprising a plurality of seals mounted on the valve bar and the plurality of manifolds to direct fluid to one subset of the plurality of outlets while isolating others of the plurality of outlets.

11. A valve assembly, comprising:
an inlet housing substrate comprising a plurality of inlet ports incrementally spaced and disposed along a linear path;
an outlet housing substrate comprising a plurality of outlet ports incrementally spaced and disposed along a linear path, wherein the inlet housing substrate and the outlet housing substrate engage with each other to define a cavity that is adapted to provide fluid communication between the plurality of inlet ports and the plurality of outlet ports; and
a valve bar, comprising a plurality of valves, disposed within the cavity, wherein:
at each position of the valve bar of a plurality of positions of the valve bar, a valve of the plurality of valves is in fluid communication with an associated inlet port of the plurality of inlet ports, while the valve is adapted to seal other inlet ports of the plurality of inlet ports;
at a first valve bar position of the plurality of positions, each valve bar port is in fluid communication with a first outlet port of the plurality of outlet ports and is isolated from other outlet ports of the plurality of outlet ports; and
at a second valve bar position of the plurality of positions, each valve bar port is in fluid communication with a second outlet port of the plurality of outlet ports and is isolated from other outlet ports of the plurality of outlet ports, the second outlet port being different from the first outlet port.

12. The valve assembly of claim 11, further comprising a plurality of manifolds, wherein:
each of the plurality of inlet ports is incrementally spaced and disposed in a linear array from a first end of the inlet housing substrate to a second end of the inlet housing substrate;
each of the plurality of outlet ports is incrementally spaced and disposed in a linear array from a first end of the outlet housing substrate to a second end of the outlet housing substrate; and
the plurality of inlet ports is in fluid communication with each of the plurality of manifolds, and the plurality of outlet ports is in fluid communication with each of the plurality of manifolds.

13. The valve assembly of claim 11, wherein a number of the plurality of outlet ports is a multiplied factor of a number of the plurality of inlet ports, and wherein the number of the plurality of inlet ports is at least two inlet ports, and the multiplied factor is at least two.

14. The valve assembly of claim 11, further comprising a plurality of seals incrementally spaced and mounted to the valve bar in a linear arrangement extending from a first end of the valve bar to a second end of the valve bar, wherein the plurality of seals engages with at least one of the plurality of valves, the inlet housing substrate, and the outlet housing substrate, to regulate the fluid communication between the plurality of inlet ports and the plurality of outlet ports.

15. The valve assembly of claim 11, further comprising an actuator adapted to move the valve bar between the plurality of positions, wherein the actuator is an electric motor based linear actuator.

16. The valve assembly of claim 11, wherein the inlet housing substrate comprises a plurality of first retainers and the outlet housing substrate comprises a plurality of second retainers, and wherein each of the plurality of first retainers engages with an associated second retainer of the plurality of second retainers to define the cavity.

* * * * *